United States Patent [19]
Tsuda et al.

[11] 3,974,509
[45] Aug. 10, 1976

[54] AUTOMATIC EXPOSURE CONTROL CIRCUIT FOR A CAMERA

[75] Inventors: Yuji Tsuda, Hirakata; Junji Kajiwara, Kadoma; Shigekazu Komori, Neyagawa, all of Japan

[73] Assignee: Matsushita Electric Industrial Co., Ltd., Japan

[22] Filed: Oct. 29, 1974

[21] Appl. No.: 518,882

[30] Foreign Application Priority Data
Oct. 31, 1973  Japan............................ 48-123149

[52] U.S. Cl. ............................................... 354/51
[51] Int. Cl.² ......................................... G03B 7/08
[58] Field of Search ................. 354/48, 50, 51, 23, 354/43; 352/141; 356/218, 226

[56] References Cited
UNITED STATES PATENTS

| | | |
|---|---|---|
| 3,611,894 | 10/1971 | Minneste .............................. 354/43 |
| 3,712,192 | 1/1973 | Ono et al. .............................. 354/51 |
| 3,817,617 | 6/1974 | Weinert .......................... 352/141 X |
| 3,827,066 | 7/1974 | Yanagisawa et al. ................. 354/51 |

*Primary Examiner*—L. T. Hix
*Assistant Examiner*—James LaBarre
*Attorney, Agent, or Firm*—Stevens, Davis, Miller & Mosher

[57] ABSTRACT

An automatic exposure control circuit for a camera or the like includes a memory circuit comprising a series connection of a capacitor and an impedance element connected to an input of a high input impedance circuit to enable the measurement of the amount of mean light during photography under a fluorescent lamp.

1 Claim, 3 Drawing Figures (a)

(b)

(c)

(d)

(e)

(f)

AUTOMATIC EXPOSURE CONTROL CIRCUIT FOR A CAMERA

The present invention relates to a memory circuit in an automatic exposure control circuit for a camera.

In a prior art automatic exposure control circuit for a single lens reflex type camera, a cadmium sulfide (CdS) cell has been used as a light sensitive element. However, since the CdS cell does not have a constant linearity value γ (the ratio of the resistance of the CdS cell to the brightness) and has a slow response characteristic under low brightness conditions, a silicon solar cell, which has no such disadvantage, has recently been employed. As a result, the instantaneous light measurement with the lens aperture of a camera positioned at a preselected position, which could not be attained in the prior art, has become possible. By the term "instantaneous light measurement with the lens aperture positioned at a preselected position" is meant an exposure control system in which the aperture of the lens is positioned at a preselected position upon depression of a release button so that the light amount after the aperture of the lens has been positioned is measured to control the exposure, and it is characterized by the ability to provide a precise response even when the above operations are performed in sequence. When the silicon solar cell is used, however, the rapid response thereof may sometimes adversely affect results. Particularly, under the illumination by a fluorescent lamp or mercury-arc lamp whose light is oscillating although it is not visible, the slow response CdS cell integrates the light since it cannot follow the oscillating light, and hence an electric quantity (a resistance value in case of the CdS cell) corresponding to a mean value of the light is produced as an output. However, when a fast response silicon solar cell is used, an electric quantiy (current or voltage in case of the silicon solar cell) which exactly follows the oscillating light is produced as an output. Thus, when such an output is stored in an automatic exposure control circuit including a memory circuit using a capacitor, the voltage across the capacitor changes from time to time so that the stored voltage varies depending on the time of storage resulting in an over-exposure or under-exposure when a photograph is taken.

It is an object of the present invention to overcome the above difficulties and to improve the exposure characteristic during photography under the illumination of an oscillating light when the instantaneous light measurement system with the lens aperture positioned at a preselected position is employed.

In accordance with the automatic exposure control circuit for the camera, of the present invention, a fast response light sensitive element such as a silicon solar cell can be used under an oscillating light source such as a fluorescent lamp or mercury-arc lamp while eliminating the variations in the light to provide a mean value thereof. Thus, the present invention may particularly find its use in in-door photography.

The present invention will now be described with reference to the accompanying drawings.

Figure 1:
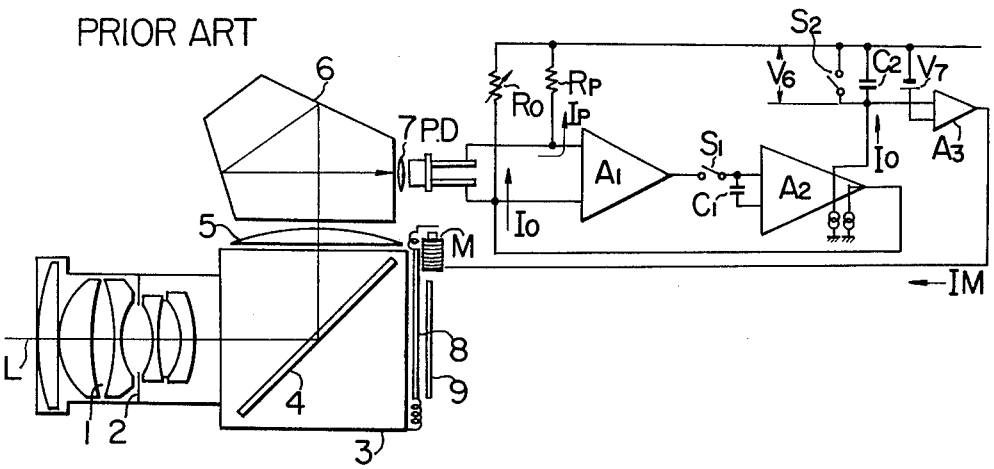
FIG. 1 is a block diagram illustrating a prior art automatic exposure control circuit.

FIG. 1 shows a block diagram of an automatic exposure control circuit of a prior art instantaneous light measurement system with the lens aperture of a camera positioned at a preselected position. In FIG. 1, 1 designates a lens system, 2 an iris vane, 3 a mirror box, 4 a reflection mirror, 5 a condenser lens, 6 a penta-prism, 7 an eye lens, 8 a focal plane shutter and 9 a flim plane. When measuring the light amount, light flux passes through the elements 1, 2, 3, 4, 5, 6 and 7 to the plane of a silicon solar cell (P.D.). When the reflection mirror 4 is turned up, the film plane 9 is to be exposed, and the light flux passes through the element 1, 2, 3 and 8 to the film plane 9. During this period, since the light path to the silicon solar cell (P.D.) is blocked, it is necessary to store the light amount at the time of the light measurement when the exposure control is to be effected. $A_1$ and $A_2$ designate amplifiers, respectively, having differential inputs of high input impedance. They constitute a negative feedback network through a feedback loop. $S_1$ represents a store switch which is thrown to its ON position during the light measurement state and to its OFF position during the storage state. $C_1$ designates a storage capacitor. The amplifier $A_2$ has two output terminals which deliver identical current outputs from a constant current circuit, one of which is coupled to the negative feedback loop while the other is used as an output to a shutter speed circuit. $S_2$ represents a trigger switch which is turned OFF upon being triggered for determining the shutter speed to start constant current charging of a charging capacitor $C_2$. $A_3$ is a comparator which has a constant voltage source $V_7$, and which, when the voltage across the charging capacitor $C_2$ rises until the condition of $V_6 = V_7$ is reached, blocks the output current $I_M$ to cut off the current flowing through a magnet M which is holding a rear curtain of the shutter to allow the rear curtain to travel. The silicon solar cell (P.D) is a kind of current generator, which causes a photo-current $I_P$ to flow through a resistor $R_P$ connected to an input terminal of the amplifier $A_1$ while a feedback current flows through a resistor $R_O$ connected to the other input terminal of the amplifier $A_1$. If the amplification degrees of the amplifiers $A_1$ and $A_2$ are sufficiently large, the voltage across the silicon solar cell P.D. merely consists of an input offset voltage. $R_O$ is usually a variable resistor, which is used to set an ASA value (the sensitivity of the film). If the amplification degree of the amplifier $A_2$ is sufficiently larger, the voltage across the storage capacitor substantially consists of an offset voltage for the amplifier $A_2$. The output current $I_O$ is approximately equal to $I_P \times R_P/R_O$.

Figure 2:
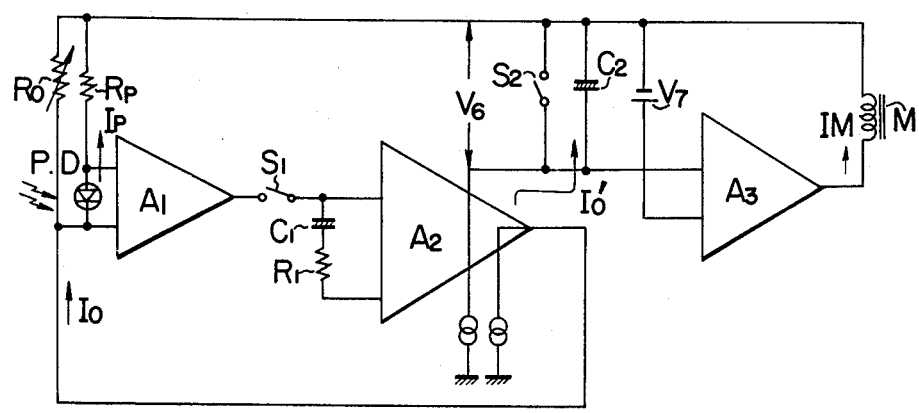
FIG. 2 is a block diagram illustrating an automatic exposure control circuit in accordance with the present invention.

FIG. 2 shows a block diagram of an automatic exposure control circuit with a memory circuit in accordance with the present invention, which is idential to the block diagram shown in FIG. 1 except that an impedance element $R_1$ is connected in series with the storage capacitor $C_1$. Accordingly, the description of the construction is omitted and only the advantage of the impedance element $R_1$ connected in series with the storage capacitor $C_1$ will now be described in detail.

Referring to FIG. 2, when the store switch $S_1$ is in its closed position, if the oscillating light such as a fluorescent lamp light or mercury-arc lamp light is impinged onto the solar cell P.D. the voltage across the storage capacitor $C_1$ and the impedance element $R_1$ also oscillates correspondingly. Actually, since the oscillating light includes not only an A.C. component but also a D.C. component it is assumed in the following discussion that the light consists of the resultant of the A.C. component and the D.C. component. If the value of the impedance element $R_1$ is selected sufficiently large in comparsion with the reactance $X_c$ of the storage capacitor $C_1$ for the A.C. component of the incident light, the D.C. component of the output of the amplifier $A_1$ is applied across the storage capacitor $C_1$ while the A.C. component is applied across the impedance element. The larger the value of $R_1$ becomes in comparison with $X_c$ the less A.C. component is applied across the storage capacitor.

With the value of the impedance element $R_1$ being selected such that the relation $X_c<<R_1$ is set, when the store switch $S_1$ is opened, only the voltage that has been applied across the storage capacitor $C_1$ is stored so that a mean value of the oscillating light can be produced at the output of the amplifier $A_2$.

Figure 3:
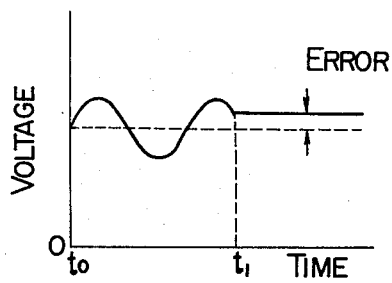
FIG. 3 shows voltage waveforms developed across a storage capacitor $C_1$ and an impedance element $R_1$ shown in FIG. 1 and FIG. 2.
Figure 3:
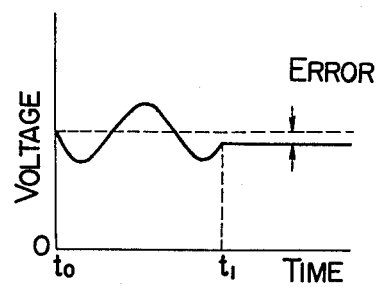
Figure 3:
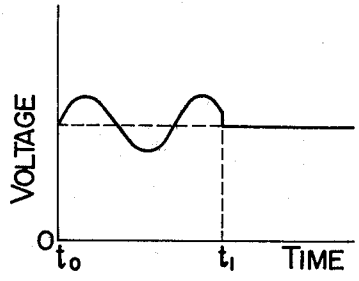
Figure 3:
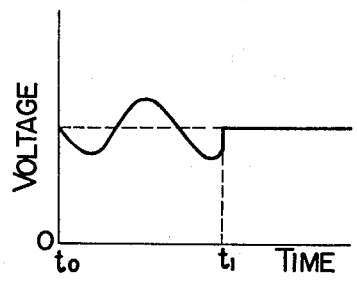
Figure 3:
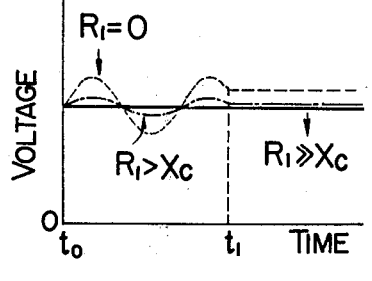
Figure 3:
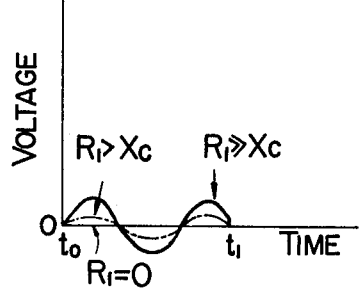

FIG. 3 diagrammatically shows the above description. In FIGS. 3 (a), (b), (c) and (d), during the time period $t_0$ to $t_1$, the store stitch $S_1$ is closed and the exposure control circuit is in the light measuring state. FIGS. 3 (a) and (b) illustrate the output voltages of the amplifier $A_1$ in FIG. 1 which shows the prior art circuit while FIGS. 3 (c) and (d) illustrate those of FIG. 2 of the present invention. In FIGS. (a), (b), (c) and (d), the time $t_1$ represents a time instant at which the store switch $S_1$ has been opened, after which the storage state begins. In the prior art apparatus, as shown in FIGS. 3 (a) and (b), since the voltages immediately before and immediately after the time $t_1$ are not different, the exposure condition significantly changes depending on the position on the oscillating waveform at which the store switch is turned off. However, according to the present invention, as shown in FIGS. 3 (c) and (d), the voltage immediately after the time $t_1$ is the mean value of the oscillating wave independently of the condition immediately before the time $t_1$ and hence no non-uniform exposure occurs. FIGS. 3 (e) and (f) show the voltage waveform across the storge capacitor $C_1$ and the impedance element $R_1$, respectively, of the circuit of FIG. 2 of the present invention. Particularly, FIG. 3 (e) shows the voltage across the capacitor $C_1$ while FIG. 3 (f) shows the voltage across the impedance element $R_1$. Thus, the resultant of the waveforms (e) and (f) corresponds to the waveform (c).

What we claim is:
1. An automatic exposure control circuit for a camera having a shutter including a rear curtain comprising a photoelectric transducer element having a fast response to light for detecting the brightness of an object, an amplifier circuit for amplifying the output of said transducer element, a differential amplifier for amplifying the output of said amplifier, a store switch connected between the output of said amplifier and an input of said differential amplifier, a charging capacitor charged by an output of said differential amplifier for determining the speed of said shutter, a trigger switch connected in parallel with said charging capacitor, a comparator for detecting the output of said charging capacitor, an electromagnetic coil for controlling said shutter rear curtain in response to the output of said comparator, and a memory circuit having a series connection consisting of a store capacitor and a resistor connected between two input terminals of said differential amplifier.

* * * * *